Dec. 8, 1953     I. A. GREENWOOD, JR., ET AL     2,661,714
ULTRASONIC GAUGE
Filed Oct. 18, 1951
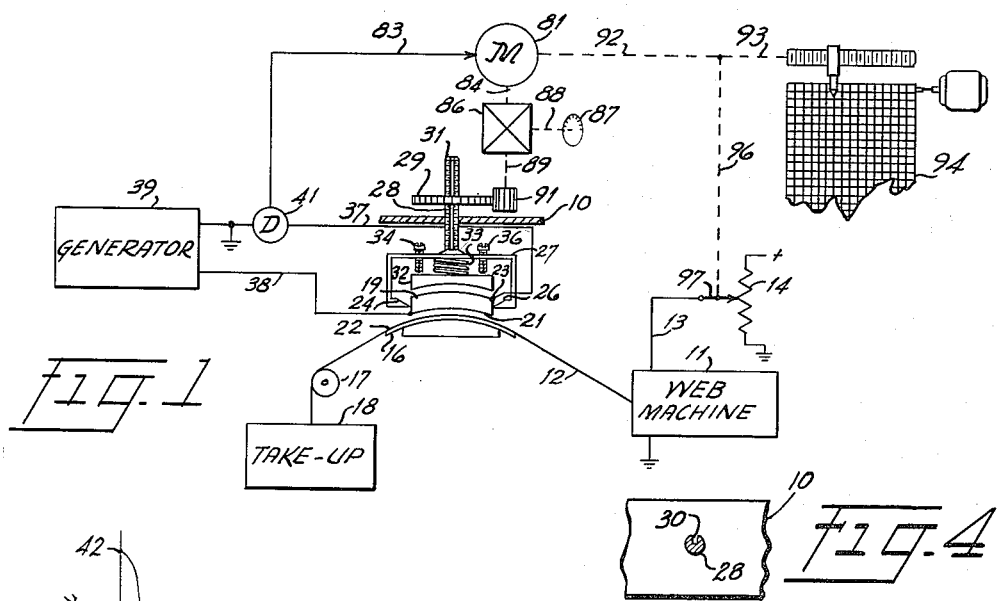
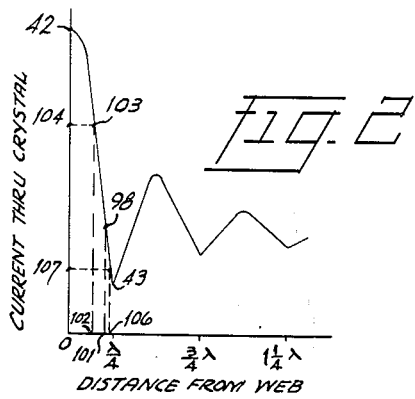
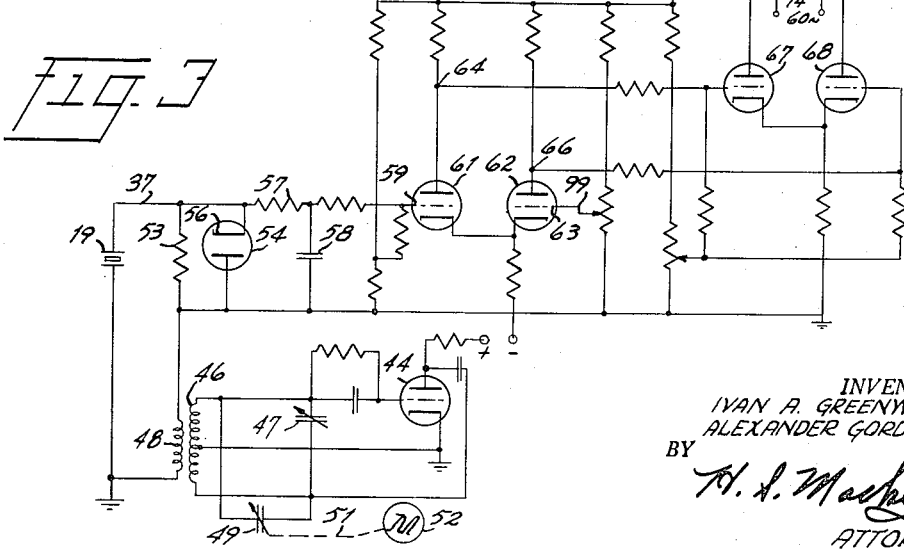
INVENTOR.
IVAN A. GREENWOOD, Jr.
ALEXANDER GORDON, Jr.
BY
H. S. Mackey
ATTORNEY.

Patented Dec. 8, 1953

2,661,714

UNITED STATES PATENT OFFICE 2,661,714

ULTRASONIC GAUGE

Ivan A. Greenwood, Jr., Pleasantville, and Alexander Gordon, Jr., Astoria, N. Y., assignors to General Precision Laboratory Incorporated, a corporation of New York Application October 18, 1951, Serial No. 251,956

7 Claims. (Cl. 118—8)

This invention pertains to an ultrasonic gauge and more specifically to an instrument for the measurement of material thickness by means of acoustic energy.

The conventional rough measurement of the thickness of a small piece of solid material is made by using carpenter's or machinist's calipers or by micrometer for more accurate measurement. Still more accurate measurement is possible with the machinist's micrometer, and for special purposes the optical micrometer or the optical interferometer is used. However, in all of these cases except the last two the instrument must be placed in contact with the work piece. The last two require employment of the human eye and of illumination, their use is slow and laborious, and they are not well adapted for use with servo systems for automatic recording and control.

On the other hand, the ultrasonic gauge of the present invention is exceedingly accurate, it permits measurement of the thickness of a substance without touching its surface, and neither the eye nor illumination is required.

The gauge of the instant invention comprises an anvil upon which the work piece is laid or across which it is made to travel, a generator of sonic or ultrasonic waves in air or other fluids near the work piece, means for measuring the energy consumed by the generator, and servomechanism for control. Its principle of operation is based on the fact of resonance between a generator of acoustic waves in a fluid medium and a reflecting surface, it being understood that acoustic waves include compressional waves of both sonic and ultrasonic frequencies.

By linear resonance is meant that more or less energy is reflected back to the generator to modify its impedance in accordance with the ratio of the linear distance between the reflecting surface and the generator to the wave length of the ultrasonic radiation. By employment of this principle of linear resonance it is possible to position an acoustic generator within a short distance of the surface of a work piece with an error that need be only a few millionths of an inch, thus ascertaining the position of the work piece surface also with the same accuracy.

The properties of the fluid between the generator and the reflector are involved in making measurements by this method, these properties including the fluid's composition, density and temperature, and in the case of a gas the amount of water vapor present. All of these properties modify the velocity of acoustic vibrations in the medium but all can be ascertained and their effects on the velocity calculated.

The relation between the distance $d$ between the generator and the reflecting surface and the impedance of the generator is that the impedance is a maximum when $$d = \frac{n\lambda}{2} \quad (1)$$

where $n$ is any integer and $\lambda$ is the wave length of the acoustic energy. The impedance is a minimum when $$d = \frac{n\lambda}{2} + \frac{\lambda}{4} \quad (2)$$

while the wavelength in the fluid is expressed by $$\lambda = \frac{v}{f} \quad (3)$$

$f$ being the frequency of the acoustic energy and $v$ the velocity in the fluid.

It has been found convenient in carrying out this invention to employ air as the fluid medium. This has the advantage in addition to the obvious one of convenient simplicity that when the work piece is employed as an ultrasonic reflector substantially all of the reflection takes place from the surface nearer the ultrasonic generator and very little if any from the further surface. This phenomenon results from the fact that the acoustic impedance of all solids and liquids is radically different from that of all gases.

It has also been found that the points of minimum impedance 1 by the generator are much sharper than the points of maximum impedance so that the minimum points are here employed in measurement.

In the Equations 1 and 2 when the integer $n$ is zero, the generator is in contact with a reflecting surface or is only one-quarter wavelength therefrom. However, $n$ may be given a value up to 10 or more while still producing an energy change great enough for practical measurement. The generator therefore does not have to be placed in contact with the work piece and the measurement may be made without any material or physical engagement. It follows therefore, that the thickness of liquid films and solid bodies having surfaces that would be injured by any physical contact therewith are more readily measured by the device of the instant invention.

The use of ultrasonic waves as a measuring means being independent of illumination required in optical systems likewise permits measurements of undeveloped photographic film or paper which would be injured by light, X-rays, or other electromagnetic radiation.

Since measurement by the instant ultrasonic gauge is fundamentally a measurement of position rather than of thickness, the invention may also be employed to measure the position of a liquid surface. The invention is therefore of use as an indicator of surface position in a micromanometer, providing an instrument which has an error as small as 50 millionths of an inch.

The acoustic frequency selected for use in the invention may theoretically have any value up to that having a wavelength comparable with the mean free molecular path of the gaseous medium in the space between the transducer and the object being measured, the upper range of frequencies being practically limited only by current techniques of ultrasonic generation. By the use of piezoelectric transducers ultrasonic fundamental frequencies between 50 kilocycles and 30 megacycles can at present be generated, and harmonic frequencies up to at least the sixth harmonic are possible. Electromagnetic and magnetostrictive transducers are more suitable for generation of frequencies below 50 kilocycles.

The indicating means of this invention is of such nature that its output energy can be amplified. Through servomechanism the amplified energy then may cause the gauge to follow the changing dimension of a solid ribbon or the position of a continuously changing liquid level. The invention can therefore be applied to the design of an automatically indicating or recording gauge, and to manufacturing equipment which acts to maintain a constant thickness, constant liquid level or constant manometer pressure.

One purpose of this invention is to provide an instrument for indicating the position of a solid or liquid surface without the necessity of physical contact therewith through the use of acoustic energy.

Another purpose of this invention is to provide an instrument for measuring the thickness of a solid or liquid sheet without physical contact therewith.

Another purpose of this invention is to provide an instrument for measuring the position of the surface of a liquid or solid sheet and thereby the sheet thickness without physical contact therewith, by employing the principle of linear resonance of acoustic energy.

Another purpose of this invention is to control the thickness of a sheet of manufactured material by continuously measuring its thickness and employing changes therein to correct such thickness.

Another purpose of this invention is to provide an instrument for measuring with great accuracy a linear dimension of an object which, by reason of the nature of its surface, cannot be physically engaged and hence cannot be measured by conventional instruments.

A further understanding of this invention can be secured from the detailed description and the drawings, in which:

Figure 1 is a schematic illustration of a circuit and mechanism of the invention.

Figure 2 is a diagram illustrating properties of an acoustic transducer used in connection with the invention.

Figure 3 is a circuit diagram of a detector-amplifier and oscillator for use in the circuit of Fig. 1.

Fig. 4 is a view illustrating a detail of the mechanism of Fig. 1.

Referring now to Fig. 1, a machine for the manufacture or for the dispensing of a web of any kind, as for example, such as disclosed in Patent No. 2,406,470 or Patent No. 2,415,644, is generally indicated at 11. The web 12 which is procured from the machine 11 may be of any material which is to be measured in thickness and at the same time this web may have a surface which may not be touched, may be light-sensitive, or may be porous. In general and in addition to common types of web such as motion picture film, paper ribbon, and metal sheet, web may have surface of such nature that no existing forms of thickness measuring instrument can be employed, such instruments depending either upon mechanical contact or air pressure or the use of electromagnetic radiations.

Let it be assumed for the purposes of explanation that the thickness of the web 12 is subject to variations in thickness by reason of variation in the process of manufacture and assume further that the particular web producing machine 11 employed may be such as to be controlled by a voltage applied through conductor 13 secured from a voltage divider 14, the voltage applied at any instant of time acting to affect or control the thickness or variation thereof of the web produced. The particular web producing machine forms no part of the present invention and is not here described since it is of interest only in consideration of its general characteristics as related to the operation of the invention.

The web 12 derived from the processing device 11 is engaged by and advanced over a stationary saddle or anvil 16 having a smooth convex upper surface and, after any necessary direction changes are effected by one or more idler pulleys such as pulley 17, is drawn into a take-up and storage compartment 18.

An acoustic transducer 19 which, for example, is a quartz piezoelectric crystal, has a concave lower surface 21 of the same curvature as the upper convex surface of the anvil 16, and is placed above the anvil so that the lower surface 21 of the transducer 19 is in close proximity to the web 12 and is substantially parallel to it at all points.

The anvil 16 is made curved and smooth so that the web 12 is engaged snugly thereby with the result that the upper surface 22 thereof lies in a defined location with reference to the lower surface 21 of the transducer 19. It is of course obvious that the common curvature of the upper surface of anvil 16 and the transducer surface 21 may be made very small and in fact that each of these surfaces may be plane if some known method such as suction be employed to hold the web 12 flat on the anvil 16 and in complete contact therewith.

The piezoelectric crystal 19 is X-cut for oscillation in the direction of its smallest dimension, and it therefore generates air compressional waves that travel out from both large surfaces of the crystal, 21 and 23, the waves from the surface 21 proceeding to the web 12. The crystal 19 is held mechanically by three clamps, schematically represented at 24 and 26, which clamp it at three notches cut along its nodal zone. These clamps 24 and 26 are suspended by a cage 27 from a screw 28 which depends from a gear 29, the hub of which is drilled and tapped to operate as a nut on the screw 28.

The gear 29 is rotatably secured to a fixed frame not shown in Fig. 1. The screw 28 is provided with a slot 31 for engagement with a tongue 30 formed on a fixed frame 10, so that the screw 28 is free to move axially but cannot rotate. Therefore, as the gear 29 is rotated its internal threads, engaging the screw 28, result in longitudinal movement thereof lifting or lowering the attached cage 27 and the crystal 19 carried thereby. Thus rotation of the gear 29 varies the distance between the crystal 19 and the upper surface 22 of the web 12.

A metal reflector 32 is suspended above the crystal 19 by means of a tension spring 33 secured to the upper surface of the reflector 32 and to the cage 27. The distance between the lower surface of the reflector 32, which is concave, and the upper convex surface 23 of the crystal 19 is accurately adjustable by means of three equiangularly placed screws, two of which are schematically depicted at 34 and 36. The purpose of this reflector is to eliminate most of the energy loss from the upper face of the crystal, such reduction or elimination of loss occurring when the wave reflected from it most strongly reinforces the vibrations of the crystal. Such action takes place when the reflecting surface is one-quarter wavelength from the crystal surface, and also occurs, but less strongly, at successive odd multiples of this distance.

The crystal 19 is electrically energized through conductors 37 and 38 attached to conducting films on its upper and lower surfaces by an electrical alternating current generator 39. The frequency of the electrical generator is that selected from the acoustic frequency to be used, and is the same as the resonant frequency of the transducer 19. To make the linear distance between half wave lengths as great as possible, it is desirable to have the frequency as low as possible. At the same time accuracy depends upon the frequency, the limit of the accuracy with which readings, either manual or automatic, can be made at any frequency being in the order of 1¼% of the wavelengths employed. If, therefore, a web having a thickness of .005 inch is to be measured or controlled with an accuracy of 1% of its thickness, or to .00005 inch, it is necessary to employ a wavelength of .0042 inch or less, corresponding to a generator frequency of 3.11 megacycles per second or more.

When the crystal 19 is energized and is at the same time moved to various distances from the web 12, the crystal 19, presents a minimum impedance when the distance is one-quarter wavelength as before mentioned, and other minima, although not so small, are found at odd integral multiples of one-quarter wavelength. These variations in the crystal impedance can be detected by a detector 41, placed in series with the crystal 19, which operates on variations in current in the conductor 37. The relation between current and the distance between the crystal and the web is depicted in Fig. 2. When the crystal is in contact with the web the maximum acoustic energy is transmitted thereto and the maximum current is drawn through the detector 41. This point is indicated at 42. The first current minimum occurs at one-quarter wavelength distance at 43, and other minima occur at successive odd integral multiples of one-quarter wavelength. Current maxima occur at half-wavelength distances.

A large variety of types of electrical generators 39 and of detector-amplifiers 41 is available for employment in this invention, the best design depending somewhat upon the frequency selected.

A preferred design is depicted in Fig. 3. A Hartley oscillator employs a triode 44 and a tank circuit consisting of an inductance 46 and a variable condenser 47. Energy is derived therefrom by means of a coil 48 inductively related to the tank coil 46, and this output energy at, say, a frequency of 3.11 megacycles is applied to the quartz crystal transducer 19.

Most transducers are temperature sensitive and some, such as quartz crystals, are exceedingly narrow band. Most oscillators are also temperature sensitive. As the result great practical difficulty arises in maintaining equality between the output generator frequency and the resonant frequency of the crystal 19. To overcome this difficulty the generator output frequency band is in effect broadened by periodically varying or "wobbling" its output frequency by a small amount. This is accomplished by shunting the tank condenser 47 with a smaller rotary variable air condenser 49, and rotating its shaft 51 by a motor 52. The motor rotates the shaft at any convenient frequency such as 30 C. P. S. The amount of generator output energy which is effective in energizing the crystal 19 is considerably reduced by this procedure, but the reduction is easily made up by later amplification. Also, although a 30 C. P. S. modulation is introduced by this procedure, this modulator frequency is easily filtered out later.

A 1000-ohm resistor 53 is placed in series with the crystal 19. In shunt with the resistor 53 there is placed a diode 54 so that negative half-cycles of the voltage developed across the resistor 53 are shunted to ground, leaving the cathode 56 charged positively in proportion to the voltage applied. This positive charge is filtered by resistor 57 and condenser 58 and applied to the input grid 59 of a direct coupled amplifier stage comprising tubes 61 and 62. A zero level for this stage is established by adjustment of the voltage applied to the grid 63, so that variations of the voltage of the grid 59 due to the input signal produce an amplified voltage differential between the plate output terminals 64 and 66, the sense of this differential voltage depending upon whether the input signal voltage value is above or below the zero level voltage of grid 63.

The first stage output is again amplified in a second direct-coupled stage comprising tubes 67 and 68. The plate voltages are secured through the control windings 69 and 71 of two saturable transformers 72 and 73, the primary windings 74 and 76 being energized by 60-cycle supply voltage. The secondary windings 77 and 78 are connected in series opposition to one phase winding 79 of a two-phase motor 81, the other phase winding 82 being energized by 60-cycle supply voltage. The direction of rotation and speed of the motor 81 is then controlled by the input voltage across the resistor 53, and by the amount and sense of the deviation of that voltage from a zero level voltage.

Returning to Fig. 1, the detector-amplifier 41, representing the detector-amplifier of Fig. 3 just described, is connected through conductor 83 to the motor 81 described in connection with Fig. 3. The motor shaft 84 is connected as one mechanical input terminal of a gear differential 86 having a calibrated setting knob 87 connected to its other input terminal shaft 88. The mechanical output terminal of the differential gear is connected through shaft 89 to a pinion 91 meshed with the gear 29. The motor output is also connected through shafts 92 and 93 to a chart recorder 94 and through shafts 92 and 96 to the slider 97 of voltage divider 14.

In operation of the mechanism of Fig. 1 the transducer is automatically adjusted vertically to variations in thickness of the web so that its distance from the web's upper surface remains constant. In the process of this adjustment the voltage divider control of the web machine is varied in such a direction as to return the web thickness to its normal value, and the voltage divider control is not restored to normal setting until the web is so returned to normal. A continuous record of all aberrations is meanwhile made by the chart recorder.

The action of the mechanism and circuit is of the servomechanism type, the transducer, its elevating mechanism and the moving web being the subtracting component. The input signal is applied by the deviation of the web from its normal thickness and the compensating motion of the transducer to preserve the quarter-wavelength distance is the feed-back signal. The difference between these two mechanical displacements generates the electrical increment signal to the detector-amplifier, constituting the system error signal. It may be shown that the resulting motor shaft displacement is proportional to the amount of deviation of the web from its normal thickness multipled by a transient quantity.

Let it be assumed that the first current minimum be selected as the control minimum, which occurs when the crystal is one-quarter wavelength from the web, and which is depicted at 43 in Fig. 2. Further, let a point 98 be selected on the curve near the point 43, this selected point being that representing the nominal or normal current through the crystal 19. This value of current is selected by adjustment of the voltage divider slider 99, Fig. 3. Then when the servomechanism is quiescent the amplifier output is zero. The crystal distance is then maintained at the point 101, Fig. 2, being a value slightly less than λ/4. Now let it be supposed that the web thickness increases, thus decreasing the distance between the web and the crystal to the point 102. This corresponds to the curve point 103 and a corresponding current 104 flows. This current represents an error current addition to the normal current; it actuates the amplifier and operates the motor 81, Fig. 1, in such direction as to raise the crystal and return the crystal distance to the value 101, when motion ceases. In the process the motor also moves the voltage divider slider 97, Fig. 1, in such direction as to return the web to its normal thickness, causing further change in the error signal and recorrection of the voltage divider slider correction movement. Any reduction of the web thickness below the normal value causes a corresponding increase in the distance of the crystal from the web to, for instance, 106, causing a reduction of the current to 107 and again operation of the servomechanism to restore normal web thickness.

The several actions in the servomechanism restoring operation actually occur simultaneously and, except for servomechanism delay and delayed control action in the web machine, maintain a web thickness at all times with an accuracy limited only by limitations of mechanical and electrical design accuracy.

The differential gear 86, Fig. 1, permits setting for any desired web thickness. The knob 87 is calibrated in thickness units and introduces an adjustment difference between the adjusted position of the crystal 19 and the normal position of the slider 97.

What is claimed is:

1. An acoustic thickness gauge for measuring the thickness of a web of material comprising, an electro-acoustic transducer for producing acoustic energy, an alternating current generator connected to and energizing said transducer, said transducer directing said acoustic energy towards the surface of said web and being positioned at a selected distance therefrom, the value of the impedance of said transducer being affected by the distance between said transducer and the surface of said web, a detector-amplifier connected to said transducer whose output varies in accordance with changes in the impedance of said transducer, a motor controlled by said detector-amplifier output for moving said transducer relative to said web whereby changes are caused in the transducer impedance, the motor movement being in such sense as to maintain said selected distance and means for indicating the degree of motor movement.

2. An acoustic thickness gauge in accordance with claim 1 in which the frequency of the output of said alternating current generator is cyclically varied over a small range.

3. An acoustic thickness gauge in accordance with claim 1 in which the output of said alternating current generator is varied over a frequency spectrum sufficiently wide to encompass the resonant frequency of said transducer over a range of ambient temperature variation.

4. An ultrasonic thickness gauge in accordance with claim 1 in which the output frequency of said alternating current generator is an ultrasonic frequency.

5. An acoustic thickness gauge for use with a mechanism for producing a web having a thickness which is to be controlled comprising, an electro-acoustic transducer for producing acoustic energy, an alternating current generator connected to and energizing said transducer, means for continuously passing said web past said transducer in position to have said acoustic energy projected thereon, the value of the impedance of said transducer being affected by the distance between the web and said transducer, a detector-amplifier connected to said transducer and actuated in accordance with changes in the impedance thereof, a motor controlled by said detector-amplifier, means operated by said motor for varying the distance between said web and said transducer in such sense as to maintain said distance at a selected value, and means operated by said motor and connected to said mechanism for producing a web for controlling the thickness thereof.

6. An acoustic thickness gauge in accordance with claim 5 in which said transducer is a piezoelectric crystal transducer.

7. An acoustic thickness gauge in accordance with claim 6 in which the face of the crystal adjacent said web is parallel thereto and constitutes the transmitting surface thereof, a solid reflector having a smooth surface adjacent and parallel to the surface of said crystal opposite to said transmitting surface, the adjacent surfaces of said reflector and crystal being adjustably spaced from each other a fraction of an acoustic energy wavelength.

IVAN A. GREENWOOD, Jr.
ALEXANDER GORDON, Jr.

References Cited in the file of this patent

UNITED STATES PATENTS

| Number | Name | Date |
|---|---|---|
| 2,031,951 | Hartley | Feb. 25, 1936 |
| 2,448,352 | Carlin | Aug. 31, 1948 |
| 2,527,208 | Berry et al. | Oct. 24, 1950 |
| 2,536,025 | Blackburn | Jan. 2, 1951 |
| 2,584,128 | Hildyard | Feb. 5, 1952 |